United States Patent Office 3,366,502
Patented Jan. 30, 1968

3,366,502
DENSIFIER AND WATERPROOFING AGENTS FOR MORTAR AND CONCRETE AND METHOD OF MAKING SAME
Mario C. Lombardo, East Northport, N.Y., assignor, by direct and mesne assignments, to Milton Kreisberg, Hempstead, and Alexander S. Minicozzi, Huntington Station, N.Y.
No Drawing. Filed Aug. 2, 1966, Ser. No. 569,574
9 Claims. (Cl. 106—314)

ABSTRACT OF THE DISCLOSURE

This invention relates to densifier and waterproofing agents for poured masonry, mortar, building cements and concrete products which undergo hydration upon curing. A method for preparing the agent comprises the steps of admixing about 50 parts by weight of a metallic soap selected from the aluminum, silicon, sodium and potassium soaps of palmitic and stearic acids and mixtures thereof, with about 50 parts by weight total of additions comprising an alkali metal aluminum sulphate, aluminum silicate and silicon dioxide, while boiling said metallic soap. The metallic soap may be white olein stearate saponified with an alkali metal carbonate, and the 50% additions comprises adding to the boiling soap product ingredients including from about 5.5 to about 8.5% by weight of aluminum potassium sulphate, about 5.0 to about 25% by weight of aluminum silicate, and about 25% to about 70% by weight of silicon dioxide, and boiling all the ingredients until a smooth colloidal solution is formed. The alkali metal carbonate is present substantially in excess of the theoretical amount needed to saponify the fatty acid, so that the excess can form a colloidal gel with the silicon dioxide. The resulting composition may be used in aqueous form or dehydrated and reconstituted with water. The composition may be further improved by adding an adhesive selected from the group consisting of casein and bone glue.

---

This invention relates to densifier and waterproofing agents for poured masonry, mortar, building cements and concrete, and to a method of producing the same.

Building materials which contain portland cement, masonry cement, puzzolan cement calcium aluminate cements and the like, which become hydrated with water to bind sand, stone and cinder aggregate, have a number of disadvantages as to properties and convenience of use. Paramount among these are perviousness to moisture and non-workability in extreme cold and hot weather. Although prior to this invention there have been numerous waterproofing admixtures for cement and concrete mixtures, their waterproofing qualities were often insufficient. Furthermore, building structures which have been rendered waterproof with such materials frequently again become pervious to water after they have dried out.

High early-strength cements or accelerators have been widely used for work which requires speed or where cold weather conditions demand costly protection and heating during the curing period. However, such accelerators often contain lime or calcium compounds and when used as brick mortar, they therefore tend to bleed out upon weathering, creating a white unsightly deposit over the surface of the brick wall where such mortar was used, requiring expensive cleaning with muriatic acid. Furthermore, maximum 28-day strength is frequently not obtained in concrete when such accelerators are used, and cracking, checking, disintegration from weathering, as well as porosity causing water seepage through concrete walls and basements, tunnels, dams, etc., is a troublesome and constant problem in such structures.

It is therefore an object of the present invention to provide a densifier and waterproofing agent which will overcome the above-mentioned difficulties.

It is a further object of the invention to provide a densifier and waterproofing composition which can be used as an additive in concrete and mortar so that the concrete and mortar can be poured or applied at freezing temperatures without the need for accelerators or costly protection during the curing period.

It is a further object of the invention to provide an admixture for pargeting compounds, for mortars, and for compounds used in sealing up seams, nail holes and joints in drywall construction, which will provide a uniform suspension of the ingredients and thus prevent separating out and require a minimum of sanding of the cured surface.

Another object is to provide a waterproofing composition which in aqueous solution can be added in lieu of water to mortar, concrete mixtures, pargeting mixtures to be applied by spraying, brushing or troweling, and to joint-filling mixtures to achieve a desired consistency of the mix and which when the latter is cured, will make it impervious to moisture.

It is a further object of the invention to provide a densifier and waterproofing agent for concrete, mortar and other cement mixtures which will be more resistant to high water pressures, weathering and sea-water as compared to waterproofing agents of the prior art.

It is another object of the invention to provide an admixture which will make it possible to work mortar and cement mixtures even in below-freezing weather without having it freeze, or in the hot sun without having it unduly dry out.

A further object of the invention is to provide an admixture for mortar, cement and concrete mixtures which will act as a retarder in hot weather, thus promoting full strength of the cured mixture.

Still another object of the invention is to provide an admixture for concrete which will make the latter harder and denser when placed underground or under water, or even under seawater, and thus will be suitable for making precast pipes, electrical conduit, and for burying waste products of nuclear reactions.

Another object is to provide a waterproofing composition which, in combination with sand and cement, will cure to form a surface which will be smooth and cause paint to adhere to it, while rejecting water, causing the water to remain only as droplets on the surface without penetrating.

Another object of the invention is to provide a dry base for a waterproofing composition which, when mixed with water, is capable of acting as a densifier and waterproofing agent for mortar, cement and concrete mixtures.

Still another object of the invention is to provide a dry base which, when mixed with water, in wide ranges of concentration, is capable of forming a densifier and waterproofing composition having properties which produce an improved waterproofing and strengthening effect on mortars, cements and concrete mixtures.

Another object of the invention is to provide an additive for concrete mixtures used in pre-cast pipes and cable conduit which will provide a smoother finish as well as a lower coefficient of friction in the surfaces of the pipes and cable conduits, so that less hand grinding is necessary to provide a smooth surface and thus avoid damage to lighting, telephone and power cables pulled through the pipes or conduits.

To these ends, and in accordance with one feature of the invention, a novel composition is formed containing about 2 to 5% of an alkali metal aluminum silicate in colloidal solution in a vehicle of a metallic fatty acid soap. According to a further feature of the invention, this vehicle comprises aluminum stearate, silicon stearate, potassium stearate and sodium stearate. This product may be used as a suspension vehicle, or preferably particulate filler matter is added thereto.

According to one method for preparing the composition, a stearate such as white olein is saponified in water in an alkali metal carbonate, and while boiling and agitating the saponified product, there is added thereto a total of approximately an equal quantity of potassium alum, kaolin and silicon dioxide. An aqueous, thick colloidal solution is formed which may be used in lieu of water in mortar or concrete mixtures, or which may be evaporated, dried, and pulverized for use as a dry base. This dry base can then be reconstituted with water for use in a similar manner.

The material as provided according to the present invention will, when applied as an admixture to cement, mortar or concrete, form a dense, non-shrinking, slippery filler for the interstices between the cement, said and aggregate, and will form a colloidal gel or suspension of its own various ingredients, and will remain stable after the cement cures without disintegrating or cracking. Consequently, the cement or concrete structures containing the novel additive will be rendered permanently waterproof.

Thus, for example, it is possible to render a masonry or concrete wall waterproof by scoring one side of the wall with a hammer, wetting it thoroughly, and applying a one-quarter inch thick coating of a mixture containing three parts of sand, one part of masonry or portland cement, and a paste containing the novel composition, troweled or sprayed onto the wetted, scored surface of the wall. A four inch thick brick wall containing ⅛ or ¼ inch pargeting coat of this mixture on its inner side, after curing two days will withstand the full pressure of a fire hose, eight feet away, fifteen minutes of each hour for six hours, without any sign of moisture penetrating through the other side of the wall.

The novel material can be used in liquid, paste or dry form in pargeting, mortar, or concrete mixtures or in smoothing mixtures of cement as a waterproofing agent in the form of a trowelling slurry or as an aqueous spray or brushing coat.

For producing the inventive material, different procedures may be followed to combine the ingredients. However, the following example is given as a preferred embodiment of the composition according to the invention. Commercial grade chemicals may be used.

EXAMPLE 1

For 100 lbs. of the composition, 200 gallons of water are brought to a boiling point. To this is added the following ingredients in the stated amounts.

| | Percent by wt. |
|---|---|
| Sodium carbonate (soda ash), $Na_2CO_3$ | 31.5 |
| Potassium carbonate (anhydrous), $K_2CO_3$ | 1.0 |
| Aluminum potassium sulphate, $AlK(SO_4)_2 \cdot 12H_2O$ | 7.0 |
| Aluminum silicate (240 mesh kaolin), $Al_2O_3 \cdot 2SiO_2 \cdot 2H_2O$ | 7.0 |
| White olein (stearate) | 18.0 |
| Silicon dioxide (240 mesh), $SiO_2$ | 35.5 |
| Total | 100.0 |

The procedure followed is preferably as follows: The sodium carbonate is gradually dissolved in the boiling water. The white olein stearate is then added, and the stirring and boiling is continued until saponification is complete. Then, maintaining the mixture at its boiling point, and while stirring, the potassium carbonate is added, and then the aluminum potassium sulphate.

Although the aluminum silicate as well as the silicon dioxide may both be added dry to the boiling mixture, it is preferable, in order to prevent foaming up and spilling over, to proceed as follows. A separate suspension is prepared in which the aluminum silicate is added to boiling water in the proportion of three (3) parts by weight of water to one part of aluminum silicate, and agitated. A separate suspension of 1:1 by weight of the $SiO_2$ in boiling water is prepared, and the aluminum silicate suspension is added to the $SiO_2$ suspension, after which the combined $SiO_2$ and aluminum silicate suspensions are added, while stirring, to the boiling soap mixture. Of course, the $SiO_2$ suspension and the aluminum silicate suspension may be added separately to the soap without being previously combined together. The boiling of the composition is continued at a temperature of 250° to 270° F. while vigorously agitating, until a smooth, uniform, thick colloidal solution results. This usually takes about another 20 to 35 minutes after saponification for a 100 lb. batch of composition. The boiling is essential, not only to obtain good saponification, but to obtain a uniform and smooth, thick pasty liquid, and to form the different stearate compounds, namely the aluminum, silicon, potassium and sodium stearates. Viscosity of the composition is then checked and boiling is discontinued when a specimen in a standard 10 cc. pipette takes 5 seconds to pass from the 10 cc. to the 5 cc. mark.

The thick pasty liquid of Example 1 can then be used in lieu of water in cement-sand mixtures or in concrete mixtures.

Example 2 illustrates a typical pargeting mixture prepared by using the liquid product of Example 1:

EXAMPLE 2

*Pargeting mix*

| | Parts by wt. |
|---|---|
| Type I portland cement, lb. | 18.8 |
| Sand (A.S.T.M. specification C-144), lb. dry weight | 32.0 |
| Liquid composition from Example 1 | 9.23 |

To test the imperviousness to water of the mix of Example 2, a cinder-block tank was prepared in the laboratory. The block assembly was cured for 7 days and then inverted and a ⅜″ thick pargeting coat of the composition of Example 2 was applied on its two sides and base. The assembly thus prepared was covered with wet burlap for 24 hours and then placed in a damp closet to cure for 27 days. The tank thus formed was then air-dried and an asbestos cement board, drilled to receive a coupling water line, was affixed with an epoxy adhesive and clamped to the open end of the tank. A static water pressure head of five feet was introduced into the tank through the water line and retained for 24 hours without the appearance of any signs of leakage through the wall. The pressure was then increased in increments until a static head was reached in excess of 25 feet, corresponding to more than 10.8 p.s.i. There was no indication of any penetration of moisture through the tank wall pargeted with the above mixture.

Identical concrete block tanks were prepared at the same time, cured in the same way, and pargeted with a similar layer, but of commercial mixtures containing calcium chloride. These block tanks each showed a damp spot indicating water penetration through the wall at a static head of less than 15 feet, corresponding to 6.50 p.s.i.

Although the percentages of ingredients given in Example 1 are preferred, the following ranges of quantities of ingredients will be found more or less operative.

TABLE I

| | Percent by wt. |
|---|---|
| Sodium carbonate (soda ash), $Na_2CO_3$ | 25.0–35.0 |
| Potassium carbonate (anhydrous), $K_2CO_3$ | 0.5– 1.5 |
| Aluminum potassium sulphate, $AlK(SO_4)_2 \cdot 12H_2O$ | 5.5– 8.5 |
| Aluminum silicate, $Al_2O_3 \cdot 2SiO_2 \cdot H_2O$ (240 mesh kaolin) | 5.0–25.0 |

White olein (stearate) _____ 15.0–20.0
Silicon dioxide (240 mesh), $SiO_2$ _____ 25.0–70.0

With the higher above-listed percentages of aluminum silicate, the silicon dioxide should be correspondingly decreased, to prevent precipitating out of the silicate. The aluminum silicate serves to keep the other ingredients in suspension. Mineral pigments may be added to the mixture, if desired, in amounts in the range of 1 to 5 percent.

EXAMPLE 4

*Dry base*

For preparing the composition according to the invention in dry form, the thick pasty liquid from Example 1, or from Table I, may be dried in a manner conventional for drying pastes, such as on drum driers from which the dried material is scraped off with a "doctor" knife, or on conveying screen driers. The dried product is then pulverized to a fine mesh (150–200 mesh) in any suitable manner, such as by rapidly rotating cutting blades. The pulverizing operation may also be omitted, if desired, in applications where the mixing operation of the dried product as scraped from the rotating drum in the various motar, pargeting, smoothing or "Spackling" mixtures, or in concrete mixtures, is sufficient to insure a uniform distribution. The dried pulverized composition may be reconstituted with water to any desired consistency and used in the same manner as above-described relative to Example 1.

EXAMPLE 5

The dry base, as powder or flakes from the drying operation, may be reconstituted by diluting one pound of the dry material with 4 gallons of water, or about 1 part to 33.3 parts of water by weight.

When the dry material is utilized in mortar or concrete mixtures containing masonry or portland cement, 2¼ pounds of the dry material, 150 to 200 mesh, is preferably used per cubic yard of cement. One 94 pound bag of cement is equivalent to about one cubic yard.

EXAMPLE 6

For mortar mixtures to lay brick, three parts of number 1 sand by volume (approximately A.S.T.M. C–144) are mixed with one part of portland or masonry cement. To each cubic yard of this sand-cement mixture, about 9 gallons of the liquid composition of Example 1 are added. No additional water is necessary.

EXAMPLE 7

In concrete work, customary proportions of cement, fine aggregate such as sand, and coarse aggregate such as stone or gravel, are employed in the usual manner, with the liquid composition of Example 1 being added in lieu of water to obtain the desired consistency. Approximately 9 gallons of this liquid composition are required per cubic yard of concrete mix. Of course, for richer mixtures and lower water-cement ratios, proportionately less than 9 gallons per cubic yard may be employed.

EXAMPLE 8

A pargeting coat prepared according to the mortar mixture of Example 5 is trowelled onto the surface of a new foundation wall exterior in lieu of customary block asphalt pitch brush coat, applied before a foundation wall or basement wall is back-filled with sand. One part of masonry or portland cement is mixed with three parts of number 1 sand (A.S.T.M. specification C–144 or finer) and the liquid of Example 1 or from Table I, for example, is added until a working consistency is achieved. The mixture may be applied until a working consistency is achieved. The mixture may be applied by trowel, spray gun or by brush. Naturally, the spray gun requires more of the liquid to obtain a working consistency. A ⅛ inch to ¼ inch coat of the material on a thoroughly wetted and hammer-scored wall is sufficient for waterproofing.

Twelve to 13 gallons of the liquid composition from Example 1 have been found suitable per cubic yard of sand-cement mixture for applying as a spray.

It will be obvious to those skilled in the art that various materials may be substituted for the ingredients listed in Table I and in the foregoing examples. For example, any of the alkali metals can be substituted in the potassium or the sodium carbonates. However, the compositions indicated in Example 1 and in Table I are preferred for the best combination of properties. If too much soda ash is used, excessive alkali will remain in the product and cause a white effervescence or unsightly deposit, and will somewhat weaken the material. If too high a percentage of soda ash is present and it is not compensated for by potassium carbonate, saponification will not be complete. Any aluminum salt of an alkali sulphate may be substituted for the aluminum potassium sulphate, for example aluminum sodium sulphate or aluminum lithium sulphate. In place of the white olein, any stearate, palmitate, or olein may be used which will saponify with an alkali carbonate. Coconut oil would also be satisfactory. If too little silicon dioxide is present or too much alkali, bleeding out will take place to cause a white unsightly deposit over the surface, or flaking. Insufficient aluminum silicate present will cause a non-uniform mixture to occur. The sodium carbonate and water will rise to the top and the silicon dioxide will settle to the bottom. Thus, the aluminum silicate forms a firm uniform suspension and colloidal solution or dispersion of all the ingredients.

EXAMPLE 9

Percent by wt.
Sodium carbonate (soda ash), $Na_2CO_3$ _____ 25.0
Potassium carbonate (anhydrous), $K_2CO_3$ _____ 0.5
Aluminum potassium sulphate, $AlK(SO_4)_2 \cdot 12H_2O$ 5.5
Aluminum silicate (240 mesh kaolin),
  $Al_2O_3 \cdot 2SiO_2 \cdot 2H_2O$ _____ 5.0
Palmitate oil _____ 15.0
Silicon dioxide (240 mesh), $SiO_2$ _____ 25.0
Inert matter such as calcium oxide or talc to make 100.0.

The ingredients are combined according to the method set forth in Example 1.

Too much lime, $CaO$, or too little silicon dioxide in any of the compositions may cause flaking or bleeding out of a white deposit upon weathering.

EXAMPLE 10

Percent by wt.
Sodium carbonate (soda ash), $Na_2CO_3$ _____ 35.0
Potassium carbonate (anhydrous), $K_2CO_3$ _____ 1.5
Aluminum potassium sulphate, $AlK(SO_4)_2 \cdot 12H_2O$ 8.5
Aluminum silicate (240 mesh kaolin),
  $Al_2O_3 \cdot 2SiO_2 \cdot 2H_2O$ _____ 25.0
White olein (stearate) _____ 20.0
Silicon dioxide (240 mesh), $SiO_2$ _____ 70.0

The ingredients are combined according to the method of Example 1.

The proportion of olein to sodium carbonate to potassium carbonate in order to obtain proper saponification is preferably as follows: 18:31.5:1.5.

The presence of the potassium carbonate produces improved emulsification.

EXAMPLE 11

A metallic fatty acid soap was prepared consisting of 18 parts of white olein to 31.5 parts sodium carbonate to 1.5 parts potassium carbonate. A composition was then prepared utilizing 50% of this soap, and while boiling, the following ingredients were added:

Percent
Aluminum potassium sulphate _____ 8.5
Aluminum silicate _____ 20.0
Silicon dioxide _____ 21.5

Total _____ 50.0

Although for saponification, the ratio of olein to sodium carbonate need only be 18:22, the excess of sodium carbonate, preferably about 31.5%, is needed in order to combine with the silicon dioxide to form a colloidal gel, which comprises a sodium potassium aluminum silicate. The ingredients are kept in suspension by the aluminum silicate, and the soapy substance is evenly distributed throughout the mixture and acts as a vehicle.

The composition according to the invention may be added in aqueous suspension to commercial plastering cements for covering taped joints and nail holes and to eliminate porosity in dry wall construction. Although heretofore it has been customary to require three coats of such "Spackling" cement to smooth over joints and nail holes, with a minimum of 24 hours drying between the coats, when the additive according to the present invention is used only two coats are required, and the plastering material more easily and covers more area, making a smoother job and reducing the total time required by one day, since the third coat is eliminated. One and one-half (1½) gallons of liquid composition from Example 1 is added per 25 pound bag of commercial gypsum-type cement such as that known as "Spackling" cement made by U.S. Gypsum Company, or "Perfatape system" manufactured by National Gypsum Company. The aqueous liquid composition according to the invention is preferably added in lieu of water, or may be reconstituted from the dry base (Example 4) with water, in an amount to achieve the desired consistency and workability.

The plastering mixture thus formed produces an extremely smooth finish, feathers out well with the trowel, and paint adheres to it in excellent fashion. Furthermore, no standing is necessary, as with prior plastering mixtures of this type.

The plastering mixture made with the mix of Example 11 can be applied in weather at temperatures of 10 to 15° F. without freezing.

EXAMPLE 12

*Adhesive additive composition*

Two and one-half ounces of casein powder was diluted with hot boiling water to make a thick paste, which was then added to one pound of the liquid composition from Example 1 and thoroughly stirred in with a butterfly mixer. The resulting composition proved satisfactory when mixed with plaster, paint, stucco and as a pargeting coat, to increase the adhesiveness of these materials.

EXAMPLE 13

*Adhesive additive composition*

The same materials were used as in Example 12, except that five ounces of casein powder were used per pound of composition from Example 1.

A pargeting coat was prepared according to Example 8 but containing 5 ounces of casein powder, was more adhesive than the material of Example 8.

EXAMPLE 14

A pargeting coat similar to Example 12 was prepared, but using two and one-half ounces of bone glue per pound of the composition of material of Example 1. The pargeting coat prepared in this manner was operative but not as effective as that of Example 12.

It will be obvious to those skilled in the art, upon studying this disclosure, that the ingredients, compositions and method steps according to my invention can be modified in various respects and hence may be embodied in processes and compositions other than those particularly described and disclosed herein by way of example, without departing from the essential features of my invention and within the scope of the claims annexed hereto.

I claim:

1. A method of preparing a waterproofing and densifying composition for masonry, mortar and concrete which undergo hydration upon curing, which comprises the steps of admixing about 50 parts by weight of an aqueous metallic soap solution wherein said soap is prepared from a fatty acid selected from palmitic and stearic acids and saponified with an alkali metal carbonate, with about 50 parts by weight total of additions comprising about 5.5 to about 8.5% aluminum potassium sulphate, about 5.0 to about 25.5% aluminum silicate, and about 25.0 to about 70% silicon dioxide, and boiling all the ingredients at a temperature exceeding about 250° F. until a smooth colloidal solution is formed.

2. The method of claim 1 wherein said metallic soap is prepared from white olein stearate saponified with an alkali metal carbonate.

3. The method of claim 1, further defined in that said alkali metal carbonate is present in an amount substantially in excess of the theoretical amount required to saponify said fatty acid, so that said excess can combine with said silicon dioxide to form a colloidal gel.

4. Method according to claim 2, including the step of continuing the boiling of all ingredients until the colloidal solution formed has a viscosity equivalent to a test showing 5 minutes time for passage by gravity of a specimen of said colloidal solution from the 10 cc. mark of the 5 cc. mark in a standard 10 cc. pipette.

5. The composition prepared according to the method of claim 2.

6. The composition prepared according to the method of claim 4.

7. A liquid waterproofing and densifier composition prepared in accordance with the method of claim 2, which comprises from 2 to 5% by weight of an alkali metal aluminum silicate in colloidal solution in an aqueous medium, said medium consisting essentially of at least one compound selected from the aluminum, silicon, sodium, and potassium soaps of palmitic and stearic acids, and mixtures thereof.

8. The dehydrated composition of claim 7.

9. A composition according to claim 7, and containing about 2½ to 5 ounces, per pound of liquid product of claim 7, of an adhesive selected from the group casein and bone glue.

References Cited

UNITED STATES PATENTS

| | | | |
|---|---|---|---|
| 2,007,427 | 7/1935 | Hermann | 106—314 |
| 2,305,483 | 12/1942 | Letters | 106—91 X |
| 2,313,107 | 3/1943 | Wertz | 106—95 X |
| 2,411,213 | 11/1946 | Johannes | 106—95 X |
| 2,804,394 | 8/1957 | Waide | 106—95 |

FOREIGN PATENTS 344,025   3/1931   Great Britain.

ALEXANDER H. BRODMERKEL, *Primary Examiner.*

L. B. HAYES, *Assistant Examiner.*